United States Patent
Johnston

[15] 3,697,768
[45] Oct. 10, 1972

[54] CONTROL SYSTEMS

[72] Inventor: James Stewart Johnston, Sussex, England

[73] Assignee: Rosemount Engineering Company, Limited, Bognor Regis, Sussex, England

[22] Filed: Feb. 10, 1971

[21] Appl. No.: 114,294

[52] U.S. Cl. ............... 307/31, 235/151.21, 307/152
[51] Int. Cl. ................................................. H02j 1/00
[58] Field of Search...... 307/38, 11, 31, 35, 149, 152; 235/151.1, 151.21

[56] References Cited

UNITED STATES PATENTS 3,514,691   5/1970   Levin et al. ............ 307/31 X
3,629,562   12/1971   Davis et al. ............ 307/31 X Primary Examiner—Herman J. Hohauser
Attorney—Dugger, Peterson, Johnson & Westman

[57] ABSTRACT

A multi-point control system suitable for applications where a large number of processes, typically in excess of 100, are all required to be stabilized at the same operating conditions. The control system comprises on-off controllers fed with a common set-point signal. The controllers being adapted to function as time-proportional controllers by the perturbation of either the set-point signal or the process parameter signal by a periodic waveform. Other signals may be combined with the perturbing signal to provide, for example, compensation for a fluctuating power supply, or for environmental conditions affecting the deviations at the inputs of controllers. Such a system has economical advantages and by slight modifications to the controllers, the system can be used for differing applications.

20 Claims, 8 Drawing Figures

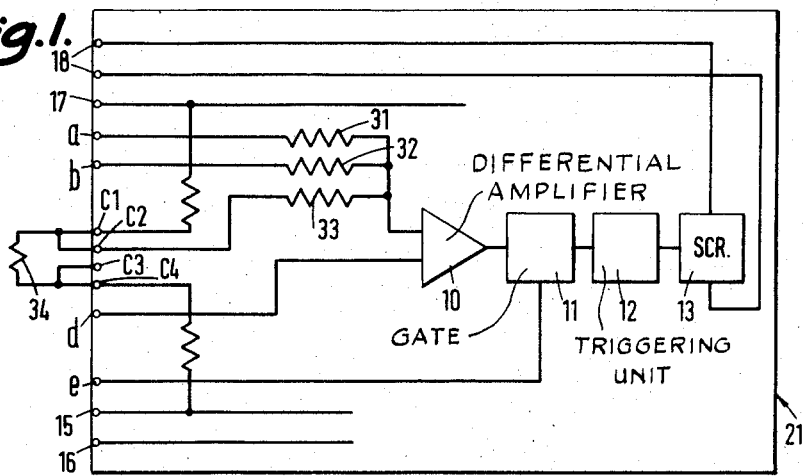
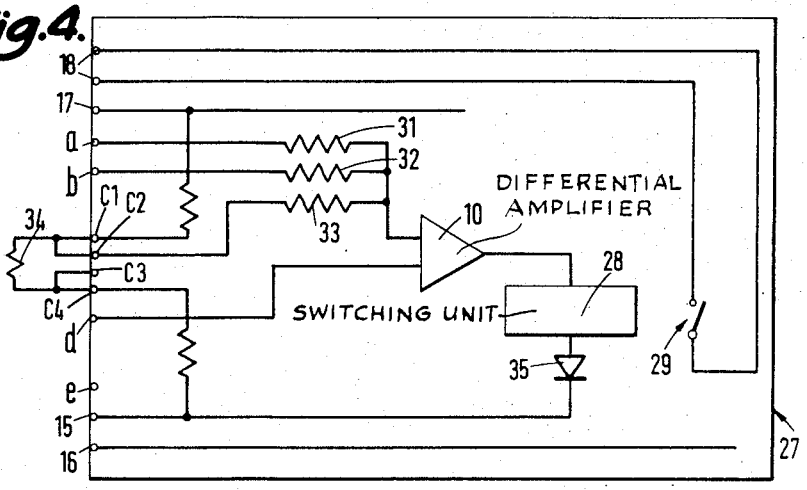
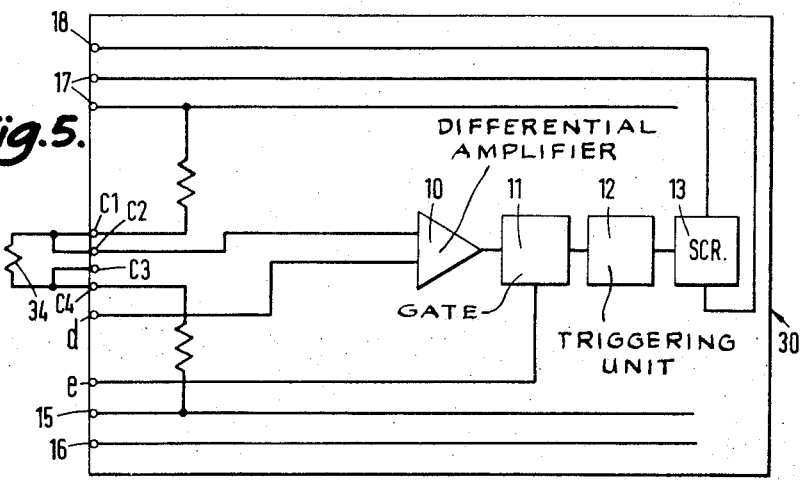

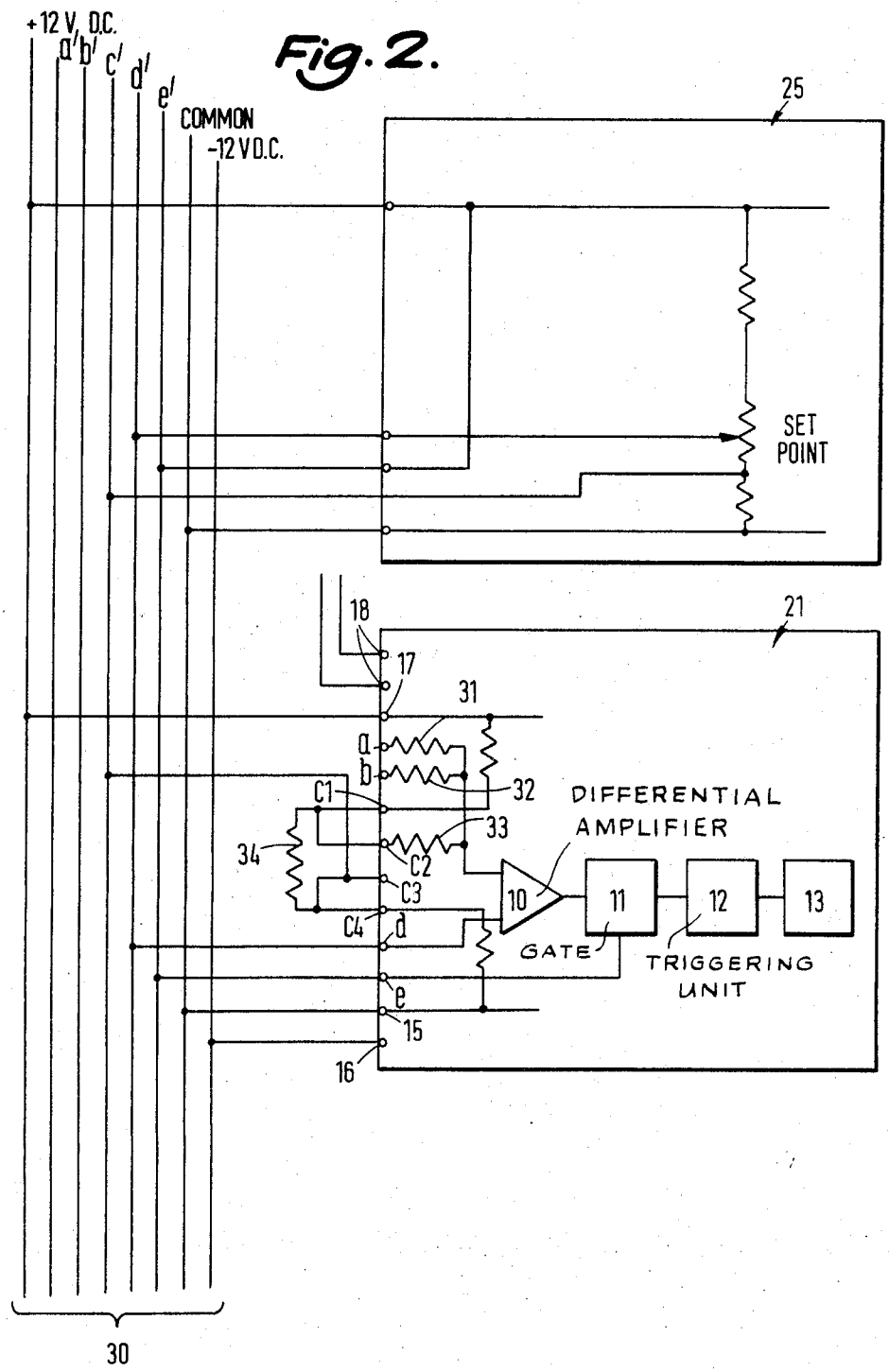

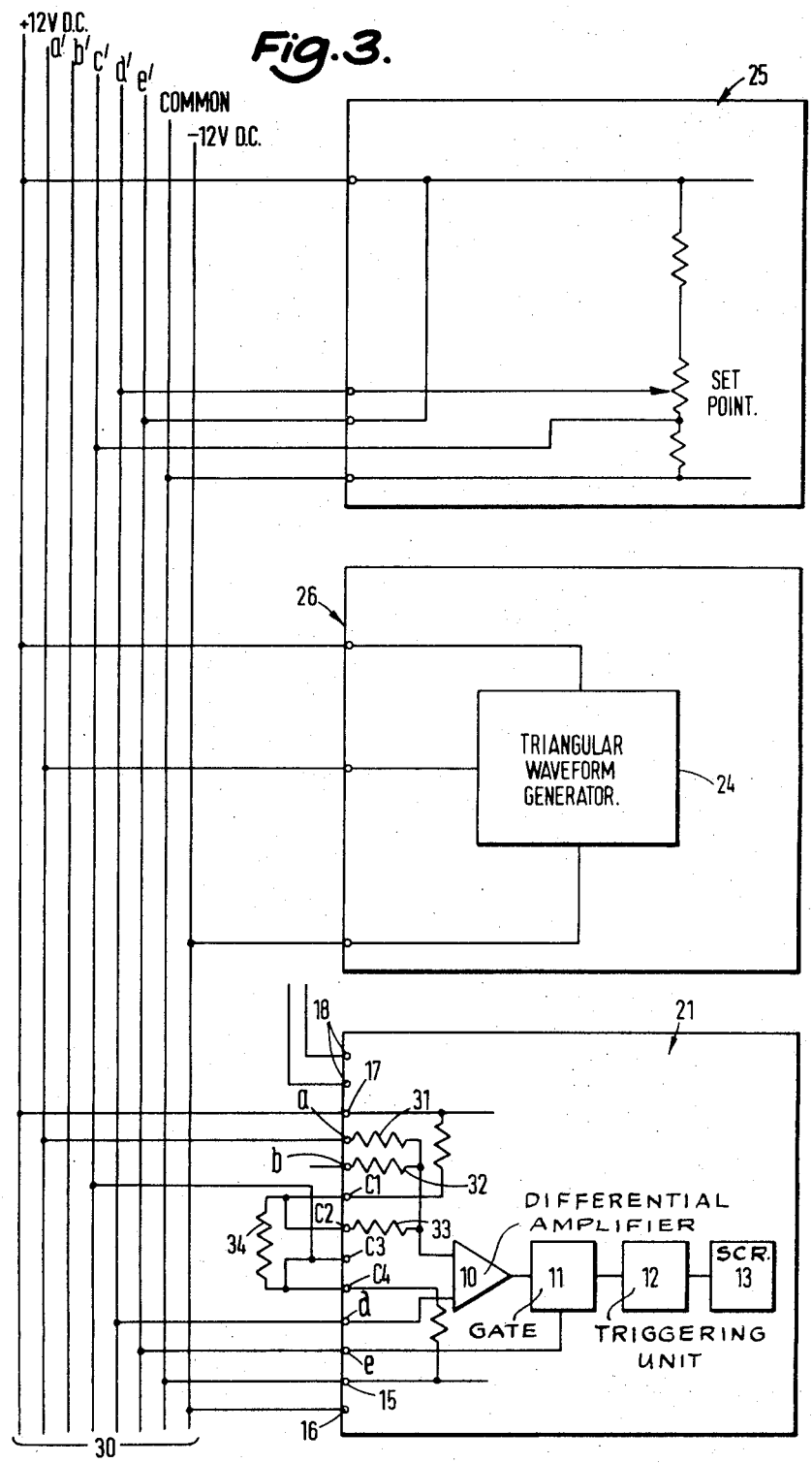

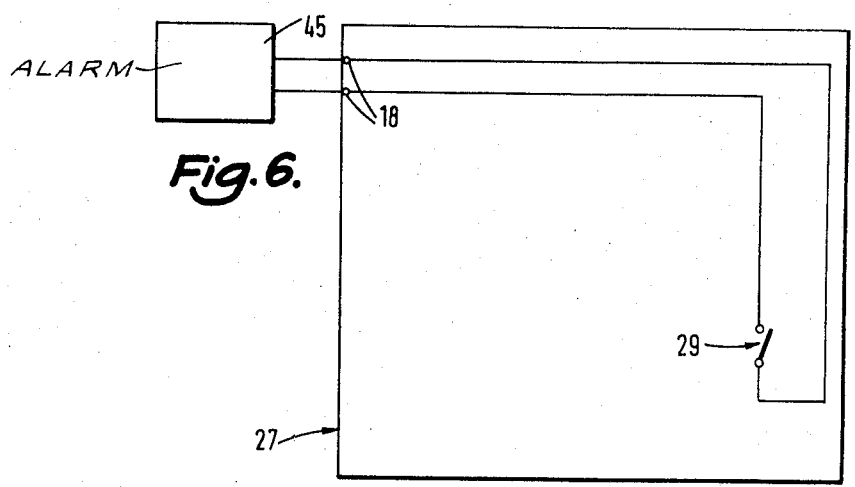
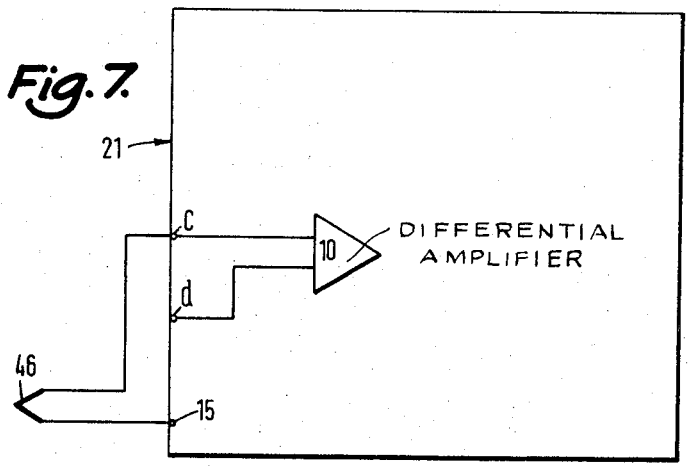
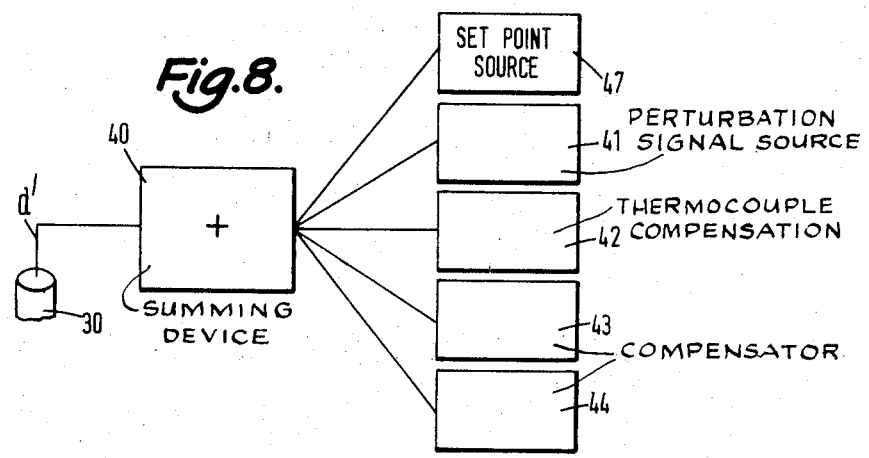

CONTROL SYSTEMS

BACKGROUND OF THE INVENTION

This invention relates to control systems in which a number of individual electrical controllers are combined to provide set-point and time proportional control of one or more process variables in response to measurement information.

An example of an application for such a control system is the control of a large number of heaters, typically in excess of 100, of a nylon draw twist machine in the textile industry, where it is required to stabilize all the heaters at the same temperature.

It is known for such applications to use a large number of proportional controllers but this results in great expense. It is therefore preferable to use on-off controllers for means of economy, however it is still desirable to use a proportional control for the stabilization of the process parameters.

Thus for reasons of economy and versatility it is desirable to reduce the amount of circuitry of the individual controllers and to remove any complex circuitry of the individual controllers, e.g., set point source, and incorporate it in a central purpose built circuit. This enables easy interchange of controllers with different control functions for differing applications.

SUMMARY OF THE INVENTION

According to this invention there is provided a control system for individually controlling the application of a power supply whereby each of a number of processes can be controlled in accordance with the deviation of the value of a sensed variable parameter of each process from a common set point for the processes, which system comprises a multi-line bus, a controller for each process in the form of a unit connected to said bus, a common power supply source for the controllers feeding common power supply lines in said bus, a common set-point signal source feeding a set-point line in said bus, a common perturbation signal source supplying a periodically varying electrical signal to a perturbation line in said bus, each controller comprising a high gain differential amplifier having a first input, a second input and an output, a sensing device providing a process variable parameter signal, means for connecting said variable parameter signal to said first input via a first resistance, means for connecting said perturbation line to said first input via a second resistance, said second input being connected to said set-point line in said bus, and switching means for controlling the application of said power supply for one of said processes, said switching means having a control input fed by the output of said differential amplifier.

The choice of power supply for control of a process will depend upon the process, for example, in one case it may be required to control a heater to stabilize an elevated temperature therefore a convenient power source would be an external mains supply, and in another case it may be required to stabilize the temperature of a refrigerated process and it may be convenient to control the flow of a coolant by actuating a solenoid valve which may be powered by an external or internal D.C. supply, which may even be the same supply as that used for the controllers. Therefore it can be seen that the power supply may be external or internal, A.C. or D.C., or even the common power supply for the controllers.

A typical controller may comprise a differential amplifier provided with a number of inputs of various impedances and an output connected to switching means for controlling the supply of electrical power to a load. The switching means may include a silicon controlled rectifier, such as a thyristor, which is fired by pulses from triggering means turned on and off by the output of the differential amplifier. The triggering means may be a blocking oscillator, or a circuit incorporating a reed switch or relay. Alternatively the switching means may simply comprise a relay with its relay contacts arranged in series with the load, its relay coil connected between the output of the differential amplifier and a terminal of a D.C. supply, there being provided means for permitting the relay coil to be energized for only one sense of said deviation.

In the case where a thyristor is to switch an A.C. supply to a load, it may be preferable to feed the output of the differential amplifier to the triggering means via an AND gate which is controlled by a gating signal so that the thyristor can only be fired at or near the zero voltage points of the voltage waveform of the A.C. supply to prevent radio frequency interference.

Conveniently each controller may be mounted on substantially identical circuit cards each provided with a series of input and output sites arranged on one edge of the card.

When temperature is one of the measured variables, the appropriate controller circuit may be provided with input impedances connected in a half-bridge configuration one arm of which includes a resistance thermometer for measuring the temperature.

A set-point signal may comprise a D.C. voltage level derived from a potential divider circuit connected across a common D.C. power supply and mounted on a separate circuit card.

Time-proportional control may be effected by generating on a further circuit card a periodically varying electrical signal, such as a triangular voltage waveform, and feeding this signal down one of the common supply lines to the inputs of appropriate controllers, whereby measurement signals to each controller are modulated and the switching means is switched on and off at a frequency equal to the frequency of the time varying electrical signal. The duration of the on and off periods is thus dependent upon the value of the measurement signal to each controller.

According to this invention there is further provided a control system for individually controlling the application of a power supply whereby each of a number of processes can be controlled in accordance with the deviation of the value of a sensed variable parameter of each process from a common setpoint for the processes, which system comprises a multiline bus, a controller for each process in the form of a unit connected to said bus, a common power supply source for the controllers feeding common power supply lines in said bus, a common set-point signal source, a common perturbation signal source, summing means for combining said set-point signal and said perturbation signal and for feeding a combined signal onto a set-point line in said bus, each controller comprising a high gain differential amplifier having a first input, a second input and an output, a sensing device providing a process variable parameter signal, means for connecting said variable parameter signal to said first input, said second input being connected to said set-point line in said bus, and switching means for controlling the application of said power supply to one of said processes, said switching means having a control input fed by the output of said differential amplifier.

There may also be provided at least one means for providing a common correction signal which is fed to said summing means. The correction signal may be derived from fluctuations of the power supply or from the average of the deviations of the inputs of the controllers.

BRIEF DESCRIPTION OF THE DRAWINGS

FIG. 1 shows a schematic circuit diagram of basic controller card;

FIG. 2 shows the basic controller card of FIG. 1 used in a system with a common set-point to provide on/off control;

FIG. 3 shows the use of a generator with the arrangement of FIG. 2 to provide time proportional control;

FIG. 4 shows a basic controller card in which a relay is used as a switching element in place of a thyristor used in the basic controller card shown in FIG. 1;

FIG. 5 shows a simplified controller card of the kind shown in FIG. 1 in which there is provision for only one input for example for the set-point signal and any further input signals are introduced by modulating this set-point signal;

FIG. 6 shows a controller card connected to an alarm device;

FIG. 7 shows a thermocouple connected to the inputs of a basic controller card; and FIG. 8 is a schematic diagram in which the set-point signal is combined with other signals.

DESCRIPTION OF THE PREFERRED EMBODIMENT

Referring to FIG. 1 a card 21 carries components for a simple controller circuit in which a high gain differential amplifier 10 has a first input connected to terminal $d$ and a second input connected to terminals $a$, $b$, $c1$, $c2$, $c3$ and $c4$ via impedances 31, 32, 33. An AND gate unit 11 is connected to the output of the differential amplifier and controls the operation of a triggering unit 12 which in turn controls the firing of a thyristor switching unit 13. In one arrangement the triggering unit may be a blocking oscillator, in another it may comprise a reed switch or relay. A pair of terminals 18 are connected to the thyristor which can then be used to pass or block cycles of an external mains power supply connected to series with a load to be controlled. The input connections to terminals $c1$ to $c4$ are so arranged that a half-bridge circuit can easily be formed, in one arm of which may be connected a resistance thermometer 34. Inhibiting of the gate 11 may be effected via a control terminal $e$. Stabilized $\pm 12v$ power supplies are connected via terminals 16 and 17 and common terminal 15 for the internal controller circuitry.

In FIG. 2 a basic controller card 21 similar to the kind shown in FIG. 1 is provided with a set-point signal generated on another circuit card 25 using a D.C. voltage signal derived from a potential divider chain between the $+12v$ and common supply lines. A series of supply lines 30 is used to interconnect the cards 21, 25, one line being used for one terminal of the basic card as required i.e. line $a'$ supplying all terminals $a$. This set-point voltage signal forms the first input to the differential amplifier 10 on terminal $d$.

Terminals $c3$ of all cards and the corresponding end of the potentiometer in the set-point signal source are connected to line $c'$. This is to satisfy the bridge conditions for each bridge formed by a sensor half-bridge network and the half-bridge network of the set-point source, the amplifier of each controller acting as the detector for its own bridge network.

The differential amplifier 10 produces an output dependent upon the deviation of the actual value of the measured variable, in this case temperature, from the desired value of that variable, represented by the "set-point" voltage signal. For some applications one input to the AND gate 11 may be permanently connected to a positive voltage so that the triggering unit 12 will start firing as soon as the measured temperature falls below the set-point. The thyristor 13 will be maintained in conduction all the time that the temperature is below the set-point and will be switched off whenever it is above. With this arrangement on/off control of a single process variable, in this case temperature, may be achieved.

Using the circuit arrangement shown in FIG. 3 time proportional control may be superimposed upon the set-point control achieved with the circuit arrangement shown in FIG. 2. This means that the duration of any control action resulting from comparisons between actual or measured values and desired or set-point values of a process variable can be varied by turning the controller successively "on" and "off" as required. In this case the variation is in synchronism with a timing source which comprises a triangular waveform generator 24 mounted on another circuit card 26. The triangular waveform has a period of about one second and is fed along a common supply line $a'$ to perturb the existing measurement signal, for example temperature derived from a resistance thermometer 34 at the second input to the differential amplifier 10 on controller card 21.

The peak-to-peak amplitude of the triangular waveform defines the allowable range of variation of the measurement signals for the time proportional control to be possible. In some applications, e.g., control of an elevated value of a parameter such as an above ambient temperature, control action is initiated when the measured value is below the set-point, however in other applications it may be required to control a depressed value of a parameter, e.g., the temperature in a refrigerator, and in this case control action is initiated when the measured value is above the set-point. The correct output can be obtained from the amplifier for both these types of application by appropriate connection of the two inputs of the differential amplifier. With an elevated temperature as the measured variable the controller will be "on" for temperatures below the set-point and "off" for temperatures above the set-point. Thus the allowable range of variation of measured temperature for time proportional control has as an upper limit, the set-point, and as a lower limit, the set-point minus the peak-to-peak amplitude of the triangular waveform. For measured values below the lower limit the controller will not turn "off" under the time modulation action of the triangular waveform and for measured values above the upper limit the controller will be continuously "off." When the measured variable, temperature, lies within the allowable range the controller "output" will comprise alternate periods of conduction and non-conduction of the thyristor 13 at a fixed frequency equal to the frequency of the triangular waveform but with a variable mark/space ratio depending on the particular value of the temperature. A disadvantage with the thyristor switching arrangement of FIG. 3 is that with such silicon controlled rectifiers which are in conduction for blocks of successive cycles, in the first cycle of conduction the point at which conduction starts is uncontrolled, since it depends only on the instant at which the measured temperature drops below the set-point. This can result in a radio-frequency interference signal which can be prevented by introducing a further waveform onto line e' instead of the + 12v D.C. connection shown in FIGS. 2 and 3, which waveform remains at zero potential except for the first millisecond of each half-cycle of the external mains supply. This restricts the initiation of conduction of the thyristor to within this period and consequently if the sum of the measured value and the perturbation signal falls below the set-point at an instant halfway through a mains half-cycle, conduction in the thyristor will not start until the beginning of the next half-cycle. Thereafter means half-cycles will be passed in bursts of the frequency of the perturbation signal until the end of the mains half-cycle following the instant the sum of these two signals lies wholly above the set-point.

If required, phase-angle control of the thyristor switching can be achieved by replacing the triangular waveform of 1 second period by one of 10 milliseconds period (for 50 Hz mains frequency) synchronized with the cycles of the external mains supply. In this case the gate would be held fully open by a permanent connection to the positive line 17.

If the mains power supply for the loads is likely to be disturbed, resulting in an equal supply fluctuation for each controller card, a signal derived from measurement of this disturbance may be introduced or "fedforward" along b' to change the effective input setting and hence output on all controllers simultaneously. Alternatively, such a common feed-forward signal may be produced by the computation of the average deviation exhibited on all controller card channels. This could be done by sequentially scanning the various controller inputs or by connection of an averaging network to the individual measuring points integrating this mean error and feeding it to all controllers along line b'. This common integral action would not eliminate independent errors on individual controllers but in many systems environmental power supply and other factors affect all controllers equally.

Although it is generally desirable to keep individual controllers as simple as possible a certain amount of adjustment of operational range of input signals for each controller may be effected by arranging for resistor 31 to be variable whereby the proportion of the modulating waveform fed to that controller may be adjusted. It would even be possible to have one of these controllers operating from its own set-point while still receiving the modulating waveform common to the remaining controllers. However, any increase in the number of independent controls for each controller tends to reduce the compatibility of the controllers with a common control system.

The modulating waveform used for time proportional control need not necessarily be the triangular waveform previously described, but may for example, be shaped so as to provide "deviation dependent sensitivity" or a linear input/output characteristic in a phase-angle switching or S.C.R. firing system.

Further the switching element need not be a thyristor or indeed any form of semiconductor controlled rectifier but, as shown in FIG. 4, may be a simple relay 28 with switch contacts 29, the relay being in series with diode 35. Alternatively the output of the amplifier may be clamped in either the positive or negative direction. The circuit of FIG. 4 is fully compatible with the common supply rails 30 and can be used for on/off or time proportional control or for example as shown in FIG. 6 as a monitoring system to switch on an alarm device 45 if the measured value deviates too sharply from the set-point.

When the measured variable is temperature a thermocouple 46 may be used in place of a resistance thermometer as shown in FIG. 7, and for more than one controller, the cold-junction compensation voltage would be supplied to all appropriate controllers by using it to adjust the set-point voltage.

In FIGS. 1, 2, 3 and 4 there are shown a number of feed-in resistors for the second input of the differential amplifier 10 and signals to perform a variety of functions may be fed along these various resistors. However, as shown in FIG. 5, it is possible to use only one input connected to terminal d and a single supply rail (not shown), normally reserved for the set-point voltage.

FIG. 8 shows an arrangement in which a set-point signal from a set-point signal source 47 is combined with a number of other signals before being fed to the set-point line d'. The set-point signal is fed to one input of a summing device 40. A perturbation signal source 41 is connected to another input of the summing device 40. Other inputs may be fed, as required, from a thermocouple cold-junction compensation source 42, a compensator 43 which provides a compensation signal dependent upon fluctuations of the power supply for the loads, and a compensator 44 which provides a compensation signal derived from the time average of the deviations of the inputs of the controllers.

The set-point signal source 47 may be identical with the set-point signal source 25 shown in FIGS. 2 and 3, but if desired may be of any other suitable circuit for providing an adjustable set-point signal, or may even be a circuit for processing or modifying a reference signal supplied by associated equipment. In the case where the sensor network is a half-bridge, these alternative circuits must produce a set-point voltage with respect to the voltage on the line c' connected to all points c3 of the controllers. If the sensor is a thermocouple, then these alternative circuits must produce a set-point voltage with respect to the reference voltage for the thermocouple, which may be the zero-volt power supply line as shown in FIG. 7.

Some embodiments of this invention find particular application in the control of textile machinery.

I claim:

1. A control system for individually controlling the application of a power supply whereby each of a number of processes can be controlled in accordance with the deviation of the value of a sensed variable parameter of each process from a common set-point for the processes, which system comprises a multi-line bus, a controller for each process in the form of a unit connected to said bus, a common power supply source for the controllers feeding common power supply lines in said bus, a common set-point signal source feeding a set-point line in said bus, a common perturbation signal source supplying a periodically varying electrical signal to a perturbation line in said bus, each controller comprising a high gain differential amplifier having a first input, a second input and an output, a sensing device providing a process variable parameter signal, means for connecting said variable parameter signal to said first input via a first resistance, means for connecting said perturbation line to said first input via a second resistance, said second input being connected to said set-point line in said bus, and switching means for controlling the application of said power supply for one of said processes, said switching means having a control input fed by the output of said differential amplifier.

2. A control system as defined in claim 1 wherein there are provided means for sensing a disturbance of said power supply for said processes and for feeding a first common correction signal to a correction signal line in said bus, and means for connecting said correction signal line to the first input of each controller via a third resistance.

3. A control system as defined in claim 1 wherein there are provided means for averaging said deviations, for deriving a second common correction signal from said averaged deviations, and for feeding said second common correction signal to another correction signal line in said bus, and means for connecting said correction signal line to the first input of each controller via another third resistance.

4. A control system as defined in claim 1 wherein there is provided for at least one controller a variable resistance sensor having one of its two ends connected via a fourth resistance to one of said common power supply lines, its other end connected via a fifth resistance to another of said common power supply lines, and a sixth resistance connected between one end of the or each sensor resistance and said first input of the or each amplifier, so that the output of the or each amplifier is of the required sense for control of said parameter.

5. A control system as defined in claim 4 wherein said set-point signal source comprises a potentiometer having one of its ends connected by a seventh resistor to said one of said common power supply lines and its other end connected by an eighth resistance to said another of said common power supply lines, the common set-point signal being fed to the set-point line in said bus from a slider of the potentiometer, and wherein said other end of the or each sensor is connected to said other end of said potentiometer via a line in said bus.

6. A control system as defined in claim 1 wherein there is provided for at least one controller a thermocouple having at least one hot and cold junction, the thermocouple having an output voltage fed to the first input of the amplifier, and means for combining a cold junction compensation voltage with said set-point signal.

7. A control system as defined in claim 1 wherein said switching means comprises a semiconductor switch having an input, and triggering means having an output for supplying a firing signal to the input of the semiconductor switch, said triggering means having an input fed by the output of a differential amplifier.

8. A control system as defined in claim 7 wherein said triggering means comprises a blocking oscillator.

9. A control system as defined in claim 7 wherein said triggering means comprises a circuit incorporating a reed relay.

10. A control system as defined in claim 7 wherein said power supply has an A.C. voltage waveform.

11. A control system as defined in claim 10 wherein there is provided a common gating signal source feeding a gating signal line in said bus, and wherein there is provided for each controller an AND gate having a first input connected to the output of the amplifier and an out-put connected to the input of said triggering means, said gate having a second input connected to said gating signal line, said gating signal comprising a short enable pulse at the start of each half-cycle of said mains power supply.

12. A control system as defined in claim 10 wherein the period of said periodically varying electrical signal is equal to a half-period of the A.C. voltage waveform of said power supply, and the waveforms are synchronized so that phase angle control of the firing of each semi-conductor switch can be obtained.

13. A control system as defined in claim 1 wherein said switching means comprises a relay having a relay coil and relay contacts, one end of said relay coil being connected to an amplifier the other end of the relay coil being connected to a common power supply line, there being provided means for permitting the relay coil to be energized for only one sense of said deviation.

14. A control system as defined in claim 13 wherein said means permitting the energizing of said relay coil comprises a diode connected in series with said relay coil.

15. A control system for individually controlling the application of a power supply whereby each of a number of processes can be controlled in accordance with the deviation of the value of a sensed variable parameter of each process from a common set-point for the processes, which system comprises a multi-line bus, a controller for each process in the form of a unit connected to said bus, a common power supply source for the controllers feeding common power supply lines in said bus, a common set-point signal source, a common perturbation signal source, summing means for combining said set-point signal and said perturbation signal and for feeding a combined signal onto a set-point line in said bus, each controller comprising a high gain differential amplifier having a first input, a second input, and an output, a sensing device providing a process variable parameter signal, means for connecting said variable parameter signal to said first input said second input being connected to said set-point line in said bus, and switching means for controlling the application of said power supply to one of said processes, said switching means having a control input fed by the output of said differential amplifier.

16. A control system as defined in claim 15 wherein there are provided means for sensing a disturbance of said power supply for said processes and for feeding a first common correction signal to said summing means.

17. A control system as defined in claim 15 where there are provided means for averaging said deviations, for deriving a second common correction signal from said averaged deviations and for feeding said second common correction signal to said summing means.

18. A control system as defined in claim 16 wherein there are provided means for averaging said deviations, for deriving a second common correction signal from said averaged deviations and for feeding said second common correction signal to said summing means.

19. A control system as defined in claim 15 wherein there is additionally provided for at least one controlled process a further controller having its switching means connected to an alarm.

20. A control system as defined in claim 1 wherein said periodically varying electrical signal is a triangular voltage waveform.

* * * * *